United States Patent [19]

Baba et al.

[11] Patent Number: 5,295,324

[45] Date of Patent: Mar. 22, 1994

[54] METHOD OF ENHANCING THE QUALITY OF PRODUCE USING AN AGRICULTURAL SHEET MATERIAL

[75] Inventors: Shigeru Baba, Chiba; Takafumi Sakurai, Osaka; Taisaburo Yokota, Chiba, all of Japan

[73] Assignee: E. I. Du Pont de Nemours and Company, Wilmington, Del.

[21] Appl. No.: 920,033

[22] Filed: Jul. 21, 1992

Related U.S. Application Data

[63] Continuation-in-part of Ser. No. 840,934, Feb. 25, 1992, abandoned.

[30] Foreign Application Priority Data

Feb. 25, 1991 [JP] Japan .............................. 3-015789[U]
Feb. 25, 1992 [JP] Japan .............................. 4-008306[U]

[51] Int. Cl.$^5$ .......................... A01G 13/00; A01G 7/00
[52] U.S. Cl. ............................................. 47/281; 47/9
[58] Field of Search ............................. 47/28.1, 9

[56] References Cited

U.S. PATENT DOCUMENTS

| | | | |
|---|---|---|---|
| 3,169,899 | 2/1965 | Steuber | 161/72 |
| 5,021,285 | 6/1991 | Ohe et al. | 47/28.1 |
| 5,138,792 | 8/1992 | Allingham | 47/9 |

Primary Examiner—Allen J. Robinson
Assistant Examiner—Deborah Lambkin

[57] ABSTRACT

A method of enhancing the quality of fruits and vegetables grown on trees and/or on plants by covering a substantial portion of the soil surrounding the plant or tree with a spunbonded nonwoven film-fibril sheet material that has been produced by a flash-spinning process. Preferably, the sheet comprises a plexifilamentary film-fibril sheet fabricated from a polyolefin such as polyethylene or polypropylene. When the spunbonded nonwoven film-fibril sheet material is used in this manner, it unexpectedly enhances fruit quality by providing excellent water resistance, moisture vapor permeability and air permeability.

8 Claims, 2 Drawing Sheets

MOISTURE
(WATER VAPOR AND
CARBON DIOXIDE)

RAIN

METHOD OF ENHANCING THE QUALITY OF PRODUCE USING AN AGRICULTURAL SHEET MATERIAL

CROSS-REFERENCE TO RELATED APPLICATION

This application is a continuation-in-part of application Ser. No. 07/840,934, filed Feb. 25, 1992, now abandoned.

FIELD OF THE INVENTION

The present invention relates to a method of enhancing the quality of produce using an agricultural sheet material. In particular, the invention relates to covering a substantial portion of the soil surrounding fruit trees, vegetable plants and flowers with a spunbonded nonwoven film-fibril sheet produced by a flash-spinning process in order to control the soil environment.

BACKGROUND OF THE INVENTION

In the past, various clear plastic sheets (i.e., films) have been used to cover agricultural greenhouses and tunnels in an effort to enhance plant growth. Recently, in the cultivation of citrus fruits in particular, a technique called mulch cultivation has been adopted. Mulch cultivation is used to enhance the quality of citrus fruit by controlling the state of the cultivated soil (e.g., ground surface is covered to inhibit the growth of weeds). Mulch cultivation also minimizes the effect of the weather (e.g., heavy rains) at the time of cultivation and it protects the ground through which the roots of the trees pass. Typically, mulch cultivation is accomplished by covering the ground surrounding the citrus trees with a colorless transparent sheet or a silver or black opaque sheet made of polyethylene or a vinyl chloride-based plastic. In particular, silver sheets consisting of a polyethylene or vinyl chloride-based plastic on which aluminum foil has been vapor deposited are useful in the mulch cultivation of peaches.

A problem with such prior art plastic sheets is that they do not allow water to pass therethrough and they have relatively no air-permeability and thus do not allow carbon dioxide or moisture vapor to evaporate from the soil underneath the plastic sheet. In cases such as this, where evaporation of moisture vapor and carbon dioxide is obstructed, the tree is weakened and the quality of the fruit is diminished. Therefore, in order to work effectively, these plastic sheets must be laid down on the ground during rainy weather so as to cover the ground through which the tree roots pass, and either removed during fair weather or folded back so as to expose the ground and allow carbon dioxide and moisture vapor to escape. Repeating this type of work up until the time of harvest is a problem because predicting the weather is difficult and such labor is time consuming and inefficient.

Therefore, it is an object of the present invention to provide a method of enhancing the quality of produce (e.g., fruits, vegetables and flowers) by using a particular kind of agricultural sheet material in place of the prior art materials currently in use. It is a further object of the invention to eliminate the above-described problems inherent in the prior art. In particular, the inventive method employs a spunbonded nonwoven film-fibril sheet material produced by a flash-spinning process which has excellent resistance to liquid water and yet excels in moisture permeability and air permeability. The spunbonded nonwoven film-fibril sheet material is able to improve the efficiency of the labor associated with mulch cultivation by not requiring sheet relocation during different weather conditions. Other objects and advantages of the present invention will become apparent to those skilled in the art upon reference to the drawings and the detailed description of the invention which hereinafter follows.

SUMMARY OF THE INVENTION

The present invention relates to a method of enhancing the quality of produce grown on plants and trees comprising covering a substantial portion of the soil surrounding the plant or tree over which the roots of the plant or tree pass with a spunbonded nonwoven film-fibril sheet material that has been produced by a flash-spinning process. The nonwoven sheet material is formed of flashspun plexilamentary film-fibril strands which have been bonded to a high density through heat and pressure. Such sheets can be produced according to the method of U.S. Pat. 3,169,899 (Steuber), the entire contents of which are incorporated herein by reference. Such sheets are commercially available under the trademark "TYVEK" spunbonded olefin from E. I. du Pont de Nemours and Company, Wilmington, Del. as Types 10 (hard paper-like structure) and 14 (soft pliable structure).

Preferably, the sheets used in the invention have a basis weight of between 40–150 $g/m^2$, a resistance to water pressure (which serves as the indicator of water resistance) of between 500–3000 mm, most preferably between 1500–2000 mm, a moisture permeability of between 3000–7000 $g/m^2/24$ hours (based on a modified method of JIS-Z-0208 described below), and an air permeability such that the Gurley Hill permeability is between 10–100 seconds.

When used in citrus tree cultivation, it is preferable that the resistance to water pressure be between 800–2000 mm, most preferably between 1500–2000 mm, that the moisture permeability be between 5000–7000 $g/m^2/24$ hours, and that the Gurley Hill permeability be between 10–50 seconds. When used in the cultivation of deciduous fruit trees (e.g., apples, peaches and persimmons), it is preferable that the resistance to water pressure be between 1000–2000 mm, that the moisture permeability be between 3000–7000 $g/m^2/24$ hours, and that the Gurley Hill permeability be between 10–100 seconds.

Preferably, the nonwoven sheet is made of a polyolefin, such as high-density polyethylene, polypropylene or a polyolefin copolymer, although other polymers, such as polyesters, can also be used effectively. Additives, such as ultraviolet light (UV) stabilizers, may also be incorporated into the sheet material as required in order to increase the life and durability of the resultant sheet.

The inventive method has found particular usefulness in orchards and groves where citrus trees (e.g., oranges) are arranged in parallel rows. The invention is also useful when used around deciduous fruit trees (e.g., apples, peaches and persimmons), vegetable and flowers.

DETAILED DESCRIPTION OF THE PREFERRED EMBODIMENTS

Sheets useful in the invention can be produced according to the method of U.S. Pat. No. 3,169,899 (Steuber). According to the preferred method of Steuber, a linear polyethylene having a density of about 0.96 g/cm$^3$, a melt index of about 0.9 (determined by ASTM method D-1238-57T, condition E) and a 135 C. upper limit of its melting temperature range is flash-spun from a 12 weight percent solution of the polyethylene in trichlorofluoromethane (CFC-11). The solution is continously pumped to spinneret assemblies at a temperature of about 179 C. and a pressure above about 85 atmospheres. The solution is passed in each spinneret assembly through a first orifice to a pressure let-down zone and then through a second orifice into the surrounding atmosphere. During flash-spinning, the low-boiling solvent (e.g., CFC-11) and polymer solution are extruded from the second orifice and the solvent is instantly vaporized. By utilizing the expansion force of the vaporizable low-boiling solvent, ultra-fine, high-strength plexifilamentary film-fibril strands can be produced.

The resulting film-fibril strands are spread and oscillated by means of a shaped rotating baffle. Thereafter, the strands are electrostatically charged and deposited on a moving collection belt. The spinnerets are spaced to provide overlapping, intersecting deposits on the belt to form a wide nonwoven film-fibril sheet. The sheet is then bonded to a high density using heat and pressure by compressing the sheet between the nip of two rollers.

When compared with nonwoven sheets formed by other processes, such as a melt-blown process that utilizes a hot fluid jet or a spin-bonding process that utilizes a compressed air stream, spunbonded nonwoven film-fibril sheets obtained by flash-spinning have higher density thus they excel in the properties required of an agricultural sheet material (e.g., durability, water resistance, opacity, air permeability, and moisture permeability).

Figure 3:
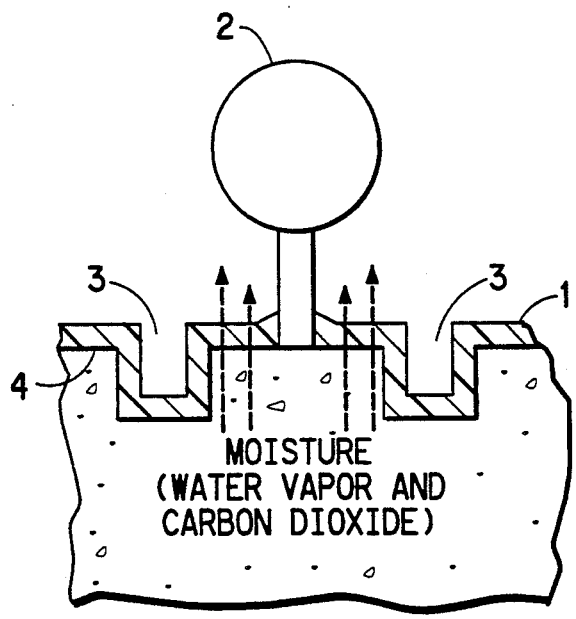
FIG. 3 illustrates the use of the sheet of FIG. 1 during fair weather.
Figure 4:
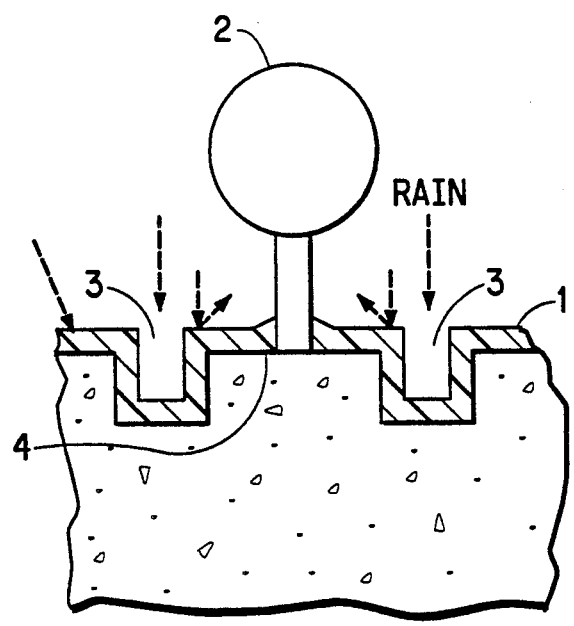
FIG. 4 illustrates the use of the sheet of FIG. 1 during rainy weather.

When spunbonded nonwoven film-fibril sheets are used according to the present invention (e.g., E. I. du Pont de Nemours and Company's Type 10 or Type 14 "TYVEK"), the sheets possess excellent toughness and durability. Styles 1060B and 1072T (hard structure) and 1422T (soft structure), corresponding to Type 10 and Type 14 "TYVEK", respectively, are particularly useful in the invention. In addition, the resistance to water pressure is high (the water pressure resistance of Type 10 "TYVEK" is about 1600 mm); hence, as shown in FIG. 4, even in rainy weather, the rainwater does not reach the ground directly covered by the sheet material and the roots of the trees in the soil making it possible to maintain the cultivation soil in a dry state. At the same time, because this material has ultra-fine plexifilamentary strands that have been blended and laminated to a high density, the opacity and whiteness of the sheets are high. As a result, sunlight is reflected by the sheet surface and is not allowed to penetrate below the sheet thereby inhibiting the growth of weeds. Moreover, because the sheet's air permeability and moisture permeability are both outstanding, as shown in FIG. 3, moisture vapor that evaporates from the soil (ground surface) and carbon dioxide are allowed to pass through the sheet. This means that these gases are not trapped in the soil under the sheet where they could have an adverse effect upon the growth of the tree, the setting of seeds, or the formation of fruits, vegetables or flowers.

As noted before, the moisture permeability of the sheet should be between 3000–7000 g/m$^2$/24 hours, as measured by a slightly modified version of JIS-Z-0208 (Testing Method for Determination of the Water Vapor Transmission Rate of Moisture-Proof Packaging Materials (Dish Method)). In the modified method, the standard operation times of 24, 48 or 96 hours were shortened to only 4 hours.

In this manner, the spunbonded nonwoven film-fibril sheets may be placed on the ground over the roots of the plants or trees in any weather, and no further labor involving the sheet is necessary. This represents a great improvement in the efficiency of the labor associated with mulch cultivation compared to the use of prior art sheets.

The method of use of the spunbonded nonwoven film-fibril sheet shall now be described in more detail through the use of the following non-limiting examples.

EXAMPLES

EXAMPLE 1

Figure 1:
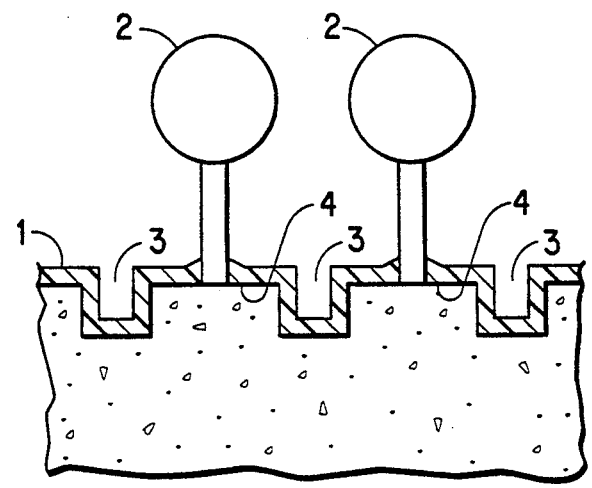
FIG. 1 illustrates the inventive method in which a spunbonded nonwoven film-fibril sheet is used.

In this example, Type 10 "TYVEK" (Style 1060B containing UV stabilizer) commercially available from E. I. du Pont de Nemours and Company, Wilmington, Del. was cut into sheets of appropriate size with a commonly used paper cutter. As shown in FIG. 1, these cut sheets 1 are laid down so as to substantially cover the surface of the ground 4 at the base of citrus, peach or other trees 2 surrounded and separated by agricultural water drainage ditches 3, as well as the entire surface of the drainage ditches. At the center of the area corresponding to each plot, a cut is made in the sheet 1 where the tree trunk was located, and the sheet was attached to the tree trunk with tape or plastic film so as to prevent rainwater from reaching the roots. It is preferable that there be as little of a gap as possible between the outer periphery of the tree trunk and the inside edge of the hole at the center of the sheet, however, even if a slight gap exists rain will probably not pass therethrough because the rain is often shielded by the tree's foliage. Also, from the standpoint of cost, because the portion of the sheet located over the drainage ditch 3 is only needed to collect and drain off water, normal plastic (e.g., PVC or polyethylene) sheeting may be used in place of the spunbonded nonwoven film-fibril sheet.

Figure 2A:
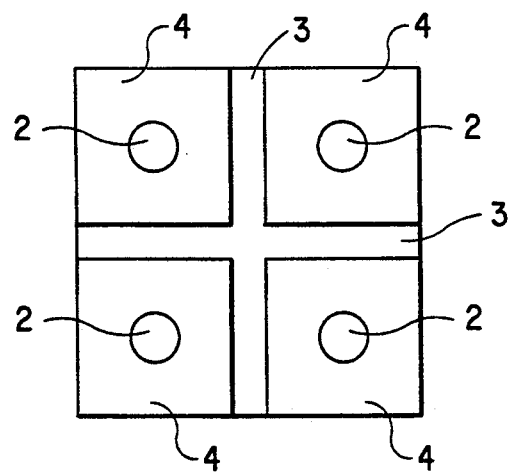
FIG. 2a shows the ground surface on which the spunbonded nonwoven film-fibril sheet of FIG. 1 is used wherein the drainage ditches are formed as a lattice.
Figure 2B:
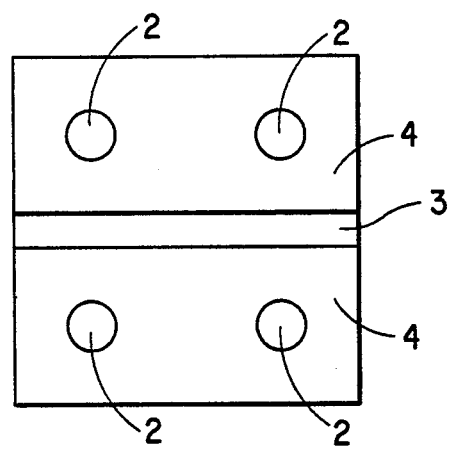
FIG. 2b shows the ground surface on which the spunbonded nonwoven film-fibril sheet of FIG. 1 is used wherein the drainage ditches are formed in a single direction.

It should be noted that in order to control soil moisture and better exploit the effects of mulch cultivation, it is preferable to provide the agricultural water drainage ditches 3 on the ground surface The drainage ditches 3 may be established lengthwise and crosswise in the form of a lattice so as to surround each of the trees in a manner shown in FIG. 2a, or they may be provided so as to extend in just one direction in the manner shown in FIG. 2b. When these ditches are arranged as shown in FIG. 2a, the drainage efficiency is high and moisture control of the soil is easy, although it takes a lot of work to establish this arrangement. Installing drainage ditches so that they extend in only one direction does result in a somewhat lower drainage efficiency than in FIG. 2a, but the desired soil moisture control is fully attainable and installation of the ditches is less effort. Hence, drainage ditches like those in FIG. 2a are installed when one plans from the start to create an area for mulch cultivation or in cases where mulch cultivation is planned when the trees are taking root, whereas drainage ditches like those in FIG. 2b are generally installed when mulch cultivation is introduced into an orchard with fully established and producing trees. Hence, suitable selection can be made according to the circumstances. Of course, the drainage ditches 3 may be arranged in a manner other than those shown in FIGS. 2a or 2b.

Using spunbonded polyolefin nonwoven film-fibril sheets according to the present invention in mulch cultivation, field tests were carried out in Japan on the early-maturing Unshu mikan (citrus mikan) tree (a particular kind of Japanese orange tree) over a period of three months from August to harvest time in October at ten mikan orchards in Kyushu and Shikoku. Once the sheets had been laid down, the sheets were left in place throughout the three month period, regardless of the weather. The harvested mikan fruit was measured with respect to its sugar level, acidity, rind color, appearance, and dimensions, all of which are important characteristics when the fruit is sold commercially. The durability and other characteristics of the sheet material used in this test were also examined.

EXAMPLE 2

Open-field cultivation was carried out as a control. Comparative examples were also carried out in which black polyethylene film, white polyethylene film, porous film (perforated plastic film with a backing of nonwoven fabric obtained by a method other than flash-spinning), black nonwoven fabric obtained by melt-blown spinning, white nonwoven fabric obtained by melt-blown spinning, and white nonwoven fabric obtained by spin-bonding, were each cut and used as an agricultural sheet in the same manner as in Example 1 above. The same conditions were used and the fruit quality was measured just as in Example 1. The results are provided in Tables 1 and 2 below. In Table 2, the sugar level was measured with a Mitsui light sensor "BRIX-21R". In the Tables, the following samples are reported:

A: Control (open-field cultivation)
B: Type 10 "TYVEK" (Style 1060B) (flash-spun spunbonded product according to the invention)
C: Polyethylene plastic film (black)
D: Polyethylene plastic film (white)
E: Porous film (perforated plastic film backed with nonwoven fabric obtained by a process other than flash-spinning)
F: Nonwoven fabric made from melt blown spun yarn (black)
G: Nonwoven fabric made from melt blown spun yarn (white)
H: Spunbonded nonwoven fabric consisting of yarn obtained by spin-bonding (white)

TABLE 1

Quality of Unshu Mikan Fruit and Characteristics of Sheet Material Used

| | Sample | | | | | | | |
|---|---|---|---|---|---|---|---|---|
| | A | B | C | D | E | F | G | H |
| Quality of Unshu mikan fruit | | | | | | | | |
| Sugar level | x | . | D | 0 | 0 | 0 | 0 | — |
| Color of rind | x | . | D | x | 0 | D | D | D |
| Fruit size and shape | x | . | — | — | 0 | — | — | 0 |
| Characteristics of sheet | | | | | | | | |
| Durability | — | . | x | x | x | 0 | 0 | x |
| Water resistance | — | . | . | . | 0** | x | x | x |
| Soil dryability | — | . | 0* | 0* | D | x | x | x |
| Reflection (sunlight) | — | . | x | x | 0 | x | x | 0 |
| Weed growth prevention | — | . | 0 | x | 0 | 0 | x | — |
| Pliability | — | x | . | . | . | D | D | 0 |
| Resistance to sliding | — | x | 0 | 0 | 0 | 0 | 0 | 0 |
| Air permeability | — | 0 | x | x | 0 | . | . | . |
| Moisture permeability | — | 0 | x | x | 0 | . | . | . |

*Condensation
**Good in new sheets, but poor in reused sheets
. = excellent
0 = good
D = fair
x = poor

TABLE 2

Sugar Level and Acidity

| | Sample | | | | |
|---|---|---|---|---|---|
| | A | B | C | E | H |
| Sugar level (BRIX, %) | | | | | |
| August 21 | 9.2 | 8.2 | 7.6 | 8.5 | 9.0 |
| September 26 | 10.4 | 10.9 | 9.0 | 9.7 | 10.6 |
| October 16 | 11.5 | 12.9 | 10.5 | 12.8 | 12.9 |
| Increase (%) | +25 | +57 | +38 | +50 | +57 |
| Acidity (g/100 ml) | | | | | |
| August 21 | 3.65 | 2.94 | 3.03 | 2.66 | 2.68 |
| September 26 | 1.77 | 1.54 | 1.47 | 1.33 | 1.10 |
| October 16 | 0.85 | 0.85 | 0.64 | 0.65 | 0.81 |
| Increase (%) | −23 | −71 | −79 | −75 | −70 |

As is clear from the Tables, agricultural sheet materials comprising Type 10 "TYVEK" (Style 1060B) exhibit the following surprising and unexpected advantages.

First, by laying down a sheet at the base of a tree regardless of the weather, rain is prevented from falling directly on the tree cultivation soil and penetrating the ground. At the same time, because moisture and carbon dioxide from the ground can pass through the sheet and can be released from the ground surface during fair weather, this eliminates the labor of having to lay the sheet down onto the cultivated soil (ground surface) and remove it depending upon the weather. Therefore, the inventive method enables an improvement in labor efficiency and makes it possible to maintain the moisture contained in the cultivated soil at a low level. The sugar level of the mikan fruit can be increased to a greater extent with Type 10 "TYVEK" than when the ground is covered with other prior art sheet materials or when the ground is left uncovered. Conversely, the acidity of the fruit can be reduced considerably with the growth of the fruit.

The color of the mikan rind was superior to that obtained when the soil was covered with other prior art sheet materials. Moreover, the fruit colored (i.e., ripened) about 1-2 weeks earlier than in the case of conventional open-field cultivation. This is thought to be related to the fact that the agricultural sheet according to the present invention has high opacity and whiteness, which strongly reflects sunlight towards the fruit and tree foliage.

In addition, the yield of flesh in the fruit itself was high and the rind was smooth and reddish in color, giving higher quality fruit than when the cultivated soil was covered with prior art sheet materials or was not covered at all.

Finally, damage to the tree and its fruit by insects and other pests was low due to the strong reflection of sunlight from the sheet used in the inventive method.

Next, for purposes of comparison, the soil temperature, concentrations of carbon dioxide and oxygen in the soil, and the amount of rootlet development were measured on Unshu mikan trees (a 25 year old Miyagawa Unshu early-maturing 81) when agricultural sheet material was used according to the invention, when other prior art sheet materials were used, and when cultivation was carried out without covering the soil. A sheet of Type 10 "TYVEK" (Style 1060B) was used as the inventive sheet. Comparative prior art sheets included black vinyl chloride-based plastic film, black polyethylene plastic film and a silver sheet. Tests were conducted on 18 trees for each kind of sheet. Tests were conducted on 9 trees when no ground-covering sheet was used. The sheets used in the tests were laid out over the entire ground surface on June 21.

When black polyethylene, black vinyl-chloride-based plastic and silver sheets were used, the change in the soil temperature on a mid-summer day 5 cm below the soil surface was between 28.5 and 41.7 C., which was high. By contrast, the change was only about 5 to 10 C. in the case of Type 10 "TYVEK" and the range of flucuation was only 24.3 to 28.5 C. When no ground covering sheet was used, the change in the soil temperature was about the same as the change in the outside temperature.

The relative carbon dioxide concentrations 25 cm below the soil surface were as follows, in decreasing order: black vinyl chloride-based plastic > silver sheet > black polyethylene > no ground covering sheet. The relative oxygen concentrations were as follows, in increasing order: black vinyl chloride-based plastic < silver sheet ≦ black polyethylene < no ground covering sheet. Even when the sheets were removed for a half-day to permit gas exchange, the same trend was observed again 3-4 days after laying down the sheets again. There was virtually no change between the results obtained using Type 10 "TYVEK" and those obtained without a ground covering sheet.

Comparing the amount of rootlet development by means of a regeneration index, rootlets developed over the entire sheet covered surface at an index of 93-170% for Type 10 "TYVEK". However, the amount of development was low for the other sheets, being 5-132% of the value prior to covering the ground.

Based on the above, it is apparent that spunbonded nonwoven film-fibril sheets, like Type 10 "TYVEK", hold down the rise in soil temperature. Moreover, because this does not obstruct the air permeability of the soil, the influence upon the rootlets and other parts of the tree appears to be small. In this way, when Type 10 "TYVEK" is used, because this does not have a negative influence on tree growth, fruit of high quality can be obtained.

EXAMPLE 3

Using Type 10 "TYVEK" (Style 1060B containing UV stabilizer) field tests were carried out on two types of Japanese peach trees (Asama Hakuto and Hakuo) over a period of 10-14 days from late July to early August in the Yamanashi Prefecture. During this period, once they had been laid down, the sheets were left alone regardless of the weather conditions.

The harvested peaches were measured for their sugar level, acidity, skin color, hardness and fruit weight, all of which are important characteristics when sold commercially. The number of samples was 25 for each of the Asama Hakuto and Hakuo peach trees. The sheets were left in place 14 days in the case of the Asama Hakuto variety and 10 days in the case of the Hakuo variety. The sugar level was measured with a Mitsui light sensor "BRIX-21R", an "Optopean" light sensor, and a sugar level meter.

For the sake of comparison, field tests were also conducted under the same conditions using silver sheets. The characteristics of the silver sheet material were essentially the same as those for the polyethylene film (black) and the polyethylene film (white) indicated in Table 1.

The results for the sugar level of Asama Hakuto are provided in Table 3, while the various measured results for Hakuo are provided in Table 4. In Table 3, column (a) provides the measurement results obtained with a Mitsui light sensor "BRIX-21R", column (b) provides the measurement results obtained using an "Optopean" light sensor and column (c) provides the measured results obtained with a sugar level meter. In Table 4, row (1) shows initial measurement results for Hakuo, while row (2) shows the measurement results 10 days after the agricultural sheet material was laid down. The average value indicated was the average of (1) and (2).

TABLE 3

| Agricultural Sheet | Ave. sugar level (%) | | | No. with sugar level of 13 or more | | | Fruit Wt. (g) |
|---|---|---|---|---|---|---|---|
| | a | b | c | a | b | c | |
| Type 10 "TYVEK" | 11.8 | 11.5 | 11.8/11.2 | 7 | 2 | 5 | 364 |
| Silver Sheet | 10.5 | 10.5 | 11.0/10.3 | 0 | 0 | 4 | 358 |

TABLE 4

| Agricultural Sheet | | Fruit Wt. (g) | Coloration Index | Hardness (lb) | Sugar Level (%) | pH | Acidity |
|---|---|---|---|---|---|---|---|
| Type 10 "TYVEK" | (1) | 207 | 3.5 | 11.3 | 12.3 | 4.62 | 0.18 |
| | (2) | 225 | 3.7 | 10.9 | 11.2 | 4.38 | 0.26 |

TABLE 4-continued

| Agricultural Sheet | | Fruit Wt. (g) | Coloration Index | Hardness (lb) | Sugar Level (%) | pH | Acidity |
|---|---|---|---|---|---|---|---|
| | Ave. | 216 | 3.6 | 11.1 | 11.8 | 4.50 | 0.22 |
| Silver | (1) | 228 | 3.0 | 10.9 | 10.6 | 4.52 | 0.20 |
| Sheet | (2) | 248 | 3.3 | 9.9 | 11.2 | 4.60 | 0.18 |
| | Ave. | 238 | 3.2 | 10.4 | 10.9 | 4.56 | 0.19 |

When Type 10 "TYVEK" was used, both Asama Hakuto and Hakuo peaches had a sugar level about 1% higher than when conventional silver sheets were used. Also, as can be seen in the case of Hakuo peaches, the degree of coloration was superior when Type 10 "TYVEK" was used as the agricultural sheet material. In the case of Asama Hakuto peaches, coloration was faster when Type 10 "TYVEK" was used. The day on which harvesting first became possible when silver sheets were used was on the third day of harvesting from trees about which Type 10 "TYVEK" was used.

As is apparent from these results, agricultural sheet materials made of spunbonded nonwoven film-fibril sheets made by flash-spinning (e.g., Type 10 "TYVEK") display the above-noted effects on deciduous tree fruit (e.g., peaches) as well as citrus fruit (e.g., oranges). First of all, this eliminates the trouble of laying down or rolling up the sheet according to the weather as is done with prior art sheets. In addition, the efficiency of associated labor can be improved, the moisture of the cultivated soil can be controlled to a low level and, compared with cases in which the ground is covered with prior art sheets, the sugar level of the peach can be increased. Moreover, coloration of the peach skin can be enhanced. The reason for this is thought to be that conventional silver sheets directly reflect sunlight, whereas Type 10 "TYVEK" scatters and reflects the sunlight because of the nature of the nonwoven film-fibril sheet. The latter thus provides efficient reflection of the sunlight, promoting the coloration of peaches on every branch. This efficient reflection of sunlight appears to contribute also to enhancement of the sugar level.

Tests like those in Example 3 were also conducted on the Hakuto and Benishimizu varieties of peaches in the Nagano and Okayama Prefectures. The results obtained were very similar to those above.

EXAMPLE 4

An additional test was conducted using sheets according to the invention and the prior art as in Examples 1-3 except that it concerned the mulch cultivation of persimmons (Nishimura early-maturing 7 year old trees). The test was conducted on three trees from August 27 to October 7 in the Kagawa Prefecture. For the sake of comparison, tests in which silver sheets were laid down and open-field cultivation in which no sheets were laid down were also carried out. Two trees were used in the open-field cultivation test. The results are provided in Table 5 below. Rows (1)-(3) in Table 5 are the measured values for different trees. The calyx ratio indicates to what degree the calyx remains attached to the fruit. A low calyx ratio is preferable.

TABLE 5

| Agricultural Sheet | | Cumulative harvest ratio (%) | | | | Fruit Wt. (g) |
|---|---|---|---|---|---|---|
| | | 9/20 | 9/25 | 10.2 | 10.7 | |
| Type 10 | (1) | 54.0 | 12.7 | 27.0 | 6.3 | 167.8 |
| "TYVEK" | (2) | 28.4 | 18.4 | 38.3 | 14.9 | 194.1 |
| | (3) | 57.1 | 17.1 | 24.3 | 1.4 | 172.0 |
| | Ave. | 46.5 | 16.1 | 29.9 | 7.5 | 178.0 |
| Silver | (1) | 13.8 | 7.3 | 46.8 | 32.1 | 209.7 |
| Sheet | (2) | 26.5 | 6.1 | 53.1 | 14.3 | 220.0 |
| | (3) | 0.0 | 4.3 | 43.5 | 52.2 | 227.4 |
| | Ave. | 13.4 | 5.9 | 47.8 | 32.9 | 219.0 |
| No | (1) | 1.1 | 0.0 | 25.8 | 73.1 | 242.6 |
| Sheet | (2) | 22.4 | 0.0 | 50.0 | 27.6 | 220.7 |
| | Ave. | 11.8 | 0.0 | 37.9 | 50.4 | 231.7 |

| Agricultural Sheet | | Coloration | BRIX (%) | Calyx Ratio (%) |
|---|---|---|---|---|
| Type 10 | (1) | | | 4.8 |
| "TYVEK" | (2) | | | 44.0 |
| | (3) | | | 15.7 |
| | Ave. | 6.0 | 16.2 | 21.5 |
| Silver | (1) | | | 56.9 |
| Sheet | (2) | | | 65.3 |
| | (3) | | | 78.3 |
| | Ave. | 6.0 | 16.1 | 66.8 |
| No | (1) | | | 84.9 |
| Sheet | (2) | | | 63.8 |
| | Ave. | 5.7 | 17.1 | 74.4 |

From Table 5 it is apparent that, as in Examples 1-3, enhanced results are obtained according to the present invention in the cultivation of persimmons as well.

Because the agricultural sheet materials used in the present inventive method comprises a spunbonded nonwoven film-fibril sheet obtained through flash-spinning, it has excellent water resistance, moisture permeability, and air permeability, thereby making it possible to enhance the efficiency of agricultural labor and to obtain high-quality produce (e.g., fruits, vegetables and flowers).

Although particular embodiments of the present invention have been described in the foregoing description, it will be understood by those skilled in the art that the invention is capable of numerous modifications, substitutions, and rearrangements without departing from the spirit or essential attributes of the invention. Reference should be made to the appended claims, rather than to the foregoing specifications, as indicating the scope of the invention.

We claim:

1. A method of enhancing the quality of produce grown on plants and trees comprising covering a substantial portion of the soil surrounding the plant or tree over which the roots of the plant or tree pass with a spunbonded nonwoven film-fibril sheet material that has been produced through a flash-spinning process, said sheet having a moisture permeability of between 3,000 and 7,000 g/m$^2$/24 hours and a resistance to water pressure of between 500-3,000 mm.

2. The method according to claim 1 wherein the nonwoven film-fibril sheet is made from a polyolefin material.

3. The method of claim 2 wherein the polyolefin is selected from the group consisting of polyethylene and polypropylene.

4. The method of claim 1 wherein the enhanced produce comprises a fruit.

5. The method of claim 4 wherein the enhanced fruit comprises a citrus fruit.

6. The method of claim 5 wherein the enhanced citrus fruit is an orange.

7. The method of claim 4 wherein the enhanced fruit is selected from the group consisting of peaches and persimmons.

8. The method of claim 1 wherein the enhanced produce comprises vegetables.

* * * * *